United States Patent [19]

Kobubu et al.

[11] 4,303,956

[45] Dec. 1, 1981

[54] LOAD-SHARING TYPE MAGNETIC HEAD

[75] Inventors: Akio Kobubu, Ibaragi; Toshio Tanaka, Sayama, both of Japan

[73] Assignees: Agency of Industrial Science & Technology; Ministry of International Trade and Industry, both of Tokyo, Japan

[21] Appl. No.: 77,265

[22] Filed: Sep. 20, 1979

[30] Foreign Application Priority Data

Oct. 6, 1978 [JP] Japan .................... 53-122682

[51] Int. Cl.³ .............................................. G11B 5/20
[52] U.S. Cl. ................................... 360/123; 360/63; 360/12
[58] Field of Search ............... 360/123, 63, 121, 122, 360/124

[56] References Cited

U.S. PATENT DOCUMENTS

| | | | |
|---|---|---|---|
| 3,058,100 | 10/1962 | Hagopian | 360/123 |
| 3,521,258 | 7/1970 | Hurt, Jr. | 360/123 |
| 3,662,361 | 5/1972 | Mee | 360/123 |
| 3,881,192 | 4/1975 | Ballinger | 360/123 |
| 3,987,488 | 10/1976 | Kanai et al. | 360/123 |

*Primary Examiner*—Alfred H. Eddleman
*Attorney, Agent, or Firm*—Oblon, Fisher, Spivak, McClelland & Maier

[57] ABSTRACT

Disclosed herein is a load-sharing type magnetic head, comprising a plurality of mutually independent arrayed magnetic head cores and a plurality of drive lines formed of coils each wound successively on the magnetic head cores in such a manner that the sequence of winding directions of the plurality of coils on each magnetic head core is different from that on all other magnetic head cores in the whole system, whereby the sum of the magnetomotive forces produced by the plurality of coils in the magnetic head cores is amply increased in the selected head core and amply decreased in the remaining cores by properly controlling the direction and/or magnitude of the electric current passed through the drive lines.

5 Claims, 9 Drawing Figures

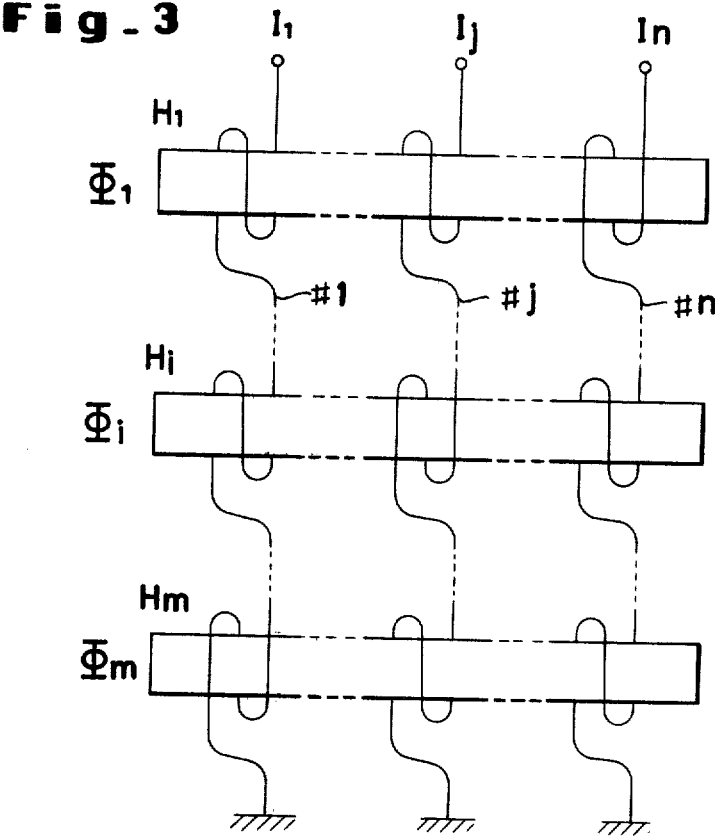
Fig_3
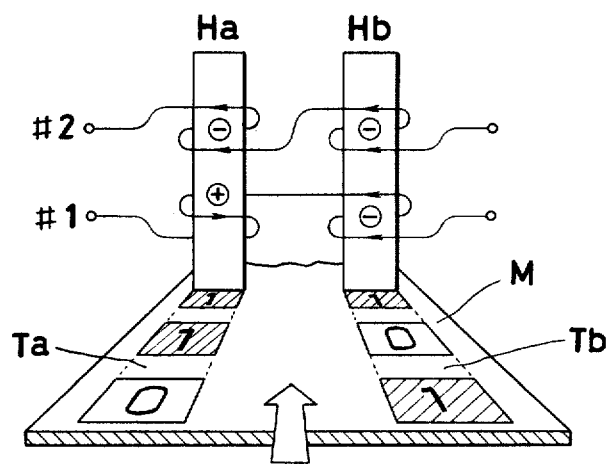
Fig_5

LOAD-SHARING TYPE MAGNETIC HEAD

BACKGROUND OF THE INVENTION

This invention relates to a load-sharing type magnetic head, comprising a plurality of magnetic head cores and a plurality of drive lines formed of coils each wound successively on the head cores, whereby the sum of the magnetomotive forces produced in the selected head core is increased amply and that produced in the remaining head cores is decreased amply by properly controlling the direction and/or magnitude of electric current passed through each of the coils of the particular drive lines selected in a given operation.

In recent years, the necessity for devices capable of recording and processing large volumes of information as in the electronic computer field has encouraged the development of devices adapted for high-density recording of information and, consequently, the development of simplified circuits configurations for such devices.

For the purpose of high-density information recording, two major approaches are conceivable one resorting to improved data processing as by the encoding of data and the other directed to increased recording density on recording media such as magnetic tapes and disks. One conceivable method in the latter approach would be to produce an extremely high-precision magnetic head for recording data and designing the recording medium in a multitrack construction and thereby increasing the number of recording tracks available for the data recording. As one way of attaining high-density recording, a multiplicity of magnetic heads is formed on a substrate using the thin-film processing techniques and the photolithography, techniques which promise to make possible large-scale integration.

The conventional magnetic head, however, is constructed so that each of the component magnetic head cores has one coil wound a required number of turns thereon and the magnetomotive force generated in the core depends on the direction and magnitude of the electric current passed through that coil. Even in the integrated production of a multiplicity of magnetic heads as by the thin-film processing techniques, there arises a necessity for providing a given substrate with as many coil terminals as magnetic heads to be deposited on the substrate. There also is a consequent necessity for providing the substrate with as many lines for connection with external circuits as magnetic heads deposited on each substrate. Owing to the presence of these terminals and lines, there is a limit to the degree of integration attainable in fabricating magnetic heads. As in the case of an independent magnetic head, the connection of one integral magnetic head with an external circuit becomes complicated in proportion as the number of component magnetic heads increases.

Heretofore, adoption of multiturn coils of a spiral construction or helical construction has been conceived as an effective means for realizing successful integration of conventional magnetic heads. The spiral construction is produced by an easy process because the coil is developed in one plane, whereas since the area occupied by the coil portion is large, it becomes difficult to sufficiently decrease the intervals between the adjacent heads. The helical construction is very difficult to produce because the number of steps in the production process increases with the increasing number of turns of the coils. Owing to these difficulties, the two constructions are prevented from being effectively adopted for large-scale integration of conventional magnetic heads.

An object of the present invention is to provide a load-sharing type magnetic head constructed wherein the drive line such as of coils wound on a plurality of head cores is simplified, the miniaturized integration is easily accomplished and high-density recording and readback of data are effectively permitted in conformity with the advanced function of the multitrack recording media such as are used in electronic computers.

Another object of the present invention is to provide a load-sharing type magnetic head constructed wherein the number of external outgoing terminals is decreased to the extent of minimizing the combining lines for connection with external circuits.

SUMMARY OF THE INVENTION

To accomplish the object described above according to this invention, there is provided a load-sharing type magnetic head, which comprises a plurality of head cores and a plurality of drive lines formed of coils adapted to cause collective excitation of all the head cores, with the sequence of winding directions of the plurality of coils on each head core differing from that on any other head core in the whole system, whereby one desired head core can be selected to be given an increased degree of excitation by suitable control of the direction and magnitude of electric current passed through the drive lines.

In the load-sharing type magnetic head of this invention, since the number of drive lines can be decreased to below that of the number of head cores, miniaturized integration of magnetic head can be easily realized. Thus, this invention proves to be particularly effective in permitting the use of a multitrack medium for data recording. The magnetic head, when combined with a level comparator, permits effective readback of binary-coded signals.

BRIEF EXPLANATION OF THE DRAWING

FIG. 3 is a schematic diagram illustrating the principle of the operation of a multitrack magnetic head according to the present invention.

FIG. 5 is a schematic diagram illustrating the principle of the readback of the load-sharing type magnetic head according to this invention.

DESCRIPTION OF THE PREFERRED EMBODIMENT

This invention relates to a load-sharing type magnetic head, comprising a simple arrangement of a plurality of drive lines of coils such as to suit application to multitrack recording media which are used in electronic computers.

FIG. 1 illustrates the principle of the operation of the load-sharing type magnetic head according to the present invention. To facilitate comprehension of the principle, this diagram shows an arrangement of two magnetic head cores Ha, Hb each having the shape of a rectangular sheet. Otherwise, as in the case of head cores of an ordinary shape, the head cores may be arranged in the shape of a ring with the two poles opposed to each other to form a head gap. These cores each have coils wound thereon. In the arrangement of a magnetic head which is composed of two head cores as illustrated in the diagram, there are provided two coils on each of the two head cores. The opposed coils wound on the two head cores are connected so as to form two serial drive lines #1, #2 both to serve the two head cores. These drive lines form terminals $t_1$, $t_2$ at one end and grounding terminals at the other end. What is important in this case is the direction in which the coils of the drive lines are wound respectively on the two head cores: i.e., when the coils of the drive lines #1, #2 are wound in the same direction on the head core Ha, they must be wound in opposite directions on the other head core Hb.

Figure 1A:
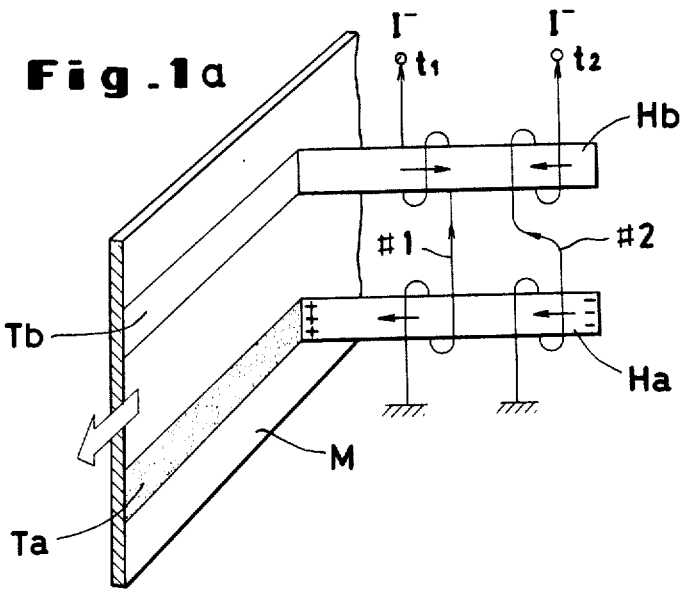
FIGS. 1a–1d are schematic diagrams illustrating the principle of magnetic recording to be effected by the load-sharing type magnetic head of this invention.
Figures 1B, 1C, 1D:
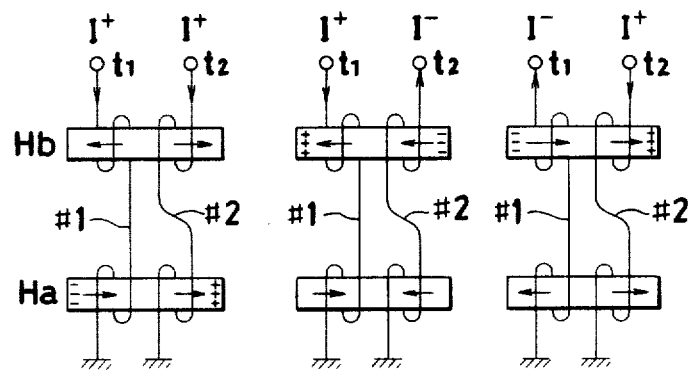

In the magnetic head constructed as described above, when negative current $I^-$ is delivered to the two terminals $t_1$, $t_2$ as illustrated in FIG. 1a, the head core Ha is excited by the two coils whose the magnetic fluxes are in the same direction (arrow marks), whereas the head core Hb is exposed to magnetic fluxes of mutually opposite direction (arrow marks). As a result, the head core Ha is given a positive pole at the pole-tip on the drive line #1 side and the overall magnetomotive force produced in the head core Ha equals the sum of the magnetomotive forces generated in the two coils. In the other head core Hb, since the two coils generate magnetic fluxes of mutually opposite directions, the overall magnetomotive force produced in the head core Hb is substantially nil because the two magnetomotive forces generated in the two coils offset each other. The status of excitation which is obtained when positive current $I^+$ is delivered to the two terminals $t_1$, $t_2$ is illustrated in FIG. 1b. In this case, the status of excitation is the exact reverse of that of FIG. 1a. When an AC current signal is delivered to the two terminals $t_1$, $t_2$ as in the case of an ordinary magnetic recording head, the statuses of excitation illustrated in FIG. 1a and FIG. 1b are assumed alternately. When the statuses of excitation of FIG. 1a and FIG. 1b are alternately repeated, no magnetic flux is generated in either of the pole-tips of the head core Hb but positive and negative magnetic fluxes are generated at the pole-tips of the head core Ha in accordance with the AC current signal being received. When a recording medium such as magnetic tape M is caused to move on the two head cores at their one ends as illustrated in FIG. 1a, therefore, the head core Ha records the data on the tape by magnetizing the recording track Ta in the tape, while the head core Hb produces no magnetic flux and, therefore, no data is recorded on track Tb.

With respect to FIG. 1c and FIG. 1d which illustrate a pair of statuses of excitation caused on delivery of an AC current signal, the electric currents to be supplied to the two terminals $t_1$, $t_2$ are mutually reversed in positive/negative status. In this case, since the two coils on the head core Ha are wound in one same direction, the magnetic fluxes are generated in this head core in mutually opposite directions and the magnetomotive forces consequently produced therein offset each other. On the other hand, the two coils on the head core Hb are wound in mutually opposite directions, the magnetic fluxes are generated in this head core in one same direction. In the case of the pair of statuses of FIG. 1c and FIG. 1d, therefore, the data are stored in the recording track Tb and no data stored in the recording track Ta.

Although the magnetic head of this invention is provided with two head cores and as many drive lines like the conventional magnetic head, the structure so far described permits the interval between two head cores to be sufficiently decreased.

The present invention further embraces magnetic head structures which are composed of more head cores. Such a magnetic head structure according to this invention can be formed by having a plurality of coils each wound successively on a plurality of arrayed head cores in such a manner as to satisfy the requirement that the sequence of winding directions of the plurality of coils on one head core differs from that on any other head core in the whole structure.

Figure 2:
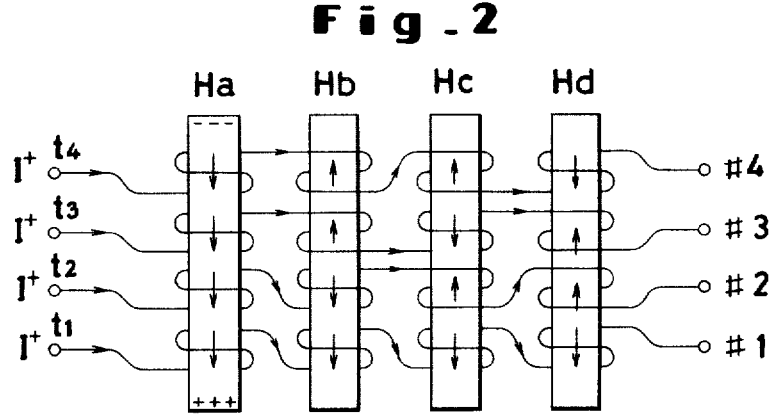
FIG. 2 is a schematic diagram illustrating the principle of the operation of one preferred embodiment of this invention, namely a magnetic head comprising four perpendicular heads.

Now the magnetic head structure of FIG. 2 which is composed of four head cores will be described. The sequence of winding directions of the four coils on the head core Ha is found on none of the remaining three head cores. This is true of each of the remaining head cores Hb, Hc and Hd.

The principle of operation which permits effective application of the magnetic head of the present invention to data recording on the multitrack recording medium will be described conceptually by reference to FIG. 3. It is now assumed that the multiple magnetic head illustrated in FIG. 3 is provided with a plurality (m) of head cores $H_l, \ldots H_i, \ldots H_m$ and a required number n ($\leq$m) of drive lines #1, ... #j, ... #n and further that the head cores and the drive lines are arranged in a structure such that delivery of electric currents $I_l, \ldots, I_j, \ldots, I_n$ each assumed to represent the value of $+1$ or $-1$ to the respective drive lines gives rise to magnetic fluxes $\Phi_l, \ldots, \Phi_i, \ldots, \Phi_m$ at the leading ends of the head cores $H_l$ through $H_m$. In this case, the magnetic fluxes and the electric currents involve a relation represented by the following formula:

$$\begin{pmatrix} \Phi_l \\ \vdots \\ \Phi_i \\ \vdots \\ \Phi_m \end{pmatrix} = \begin{pmatrix} a_{ll} & \cdots & a_{lj} & \cdots & a_{ln} \\ \vdots & & \vdots & & \vdots \\ a_{il} & \cdots & a_{ij} & \cdots & a_{in} \\ \vdots & & \vdots & & \vdots \\ a_{ml} & \cdots & a_{mj} & \cdots & a_{mn} \end{pmatrix} \begin{pmatrix} I_l \\ \vdots \\ I_j \\ \vdots \\ I_n \end{pmatrix} \quad (1)$$

In the formula, $a_{ij}$ denotes the direction of winding of a relevant coil and is assumed to represent the value of $+1$ or $-1$.

When in the core matrix, there are given electric current vectors ($I_l, \ldots I_j, \ldots I_n$) equalling the row vectors ($a_{il}, \ldots a_{ij}, \ldots a_{in}$), the magnetic fluxes generated by a total of n-coils in the head core $H_i$ have one same direction and, therefore, satisfy $\Phi_i = N$. Here, N denotes the sum of magnetomotive force to be produced when all the n-coils generate magnetic fluxes in one same direction, which sum equals to the value n. The core matrix is formed so that the coils in each row is different from that used in any other row in the whole system in terms of the coil arrangement relative to the plurality of magnetic head cores. In all the head cores $H_k$ other than i-th head core $H_i$, therefore, the magnetic fluxes generated by the n-coils have a direction different from the direction in the head core $H_i$. Hence, $\Phi_k < N$ is satisfied. The magnetic head according to the present invention, accordingly, is characterized by allowing the largest magnetic flux to be generated in only one selected head among the plurality of heads.

The row vector $(a_{i1}, \ldots, a_{ij}, \ldots, a_{in})$ of the coil matrix comprises n-binary components. When positive and negative magnetic fluxes are generated in conformity with a given set of binary data, the matrix permits a total of $(\frac{1}{2}) \cdot 2^n$ combinations of data. It is now assumed that a magnetic head consisting of a total of m-head cores $(m = (\frac{1}{2}) \cdot 2^n)$ is formed by using all the combinations thus available. As already touched upon, $\Phi_i = N$ is satisfied in the selected head core $H_i$. Now, the magnitude of the magnetic flux to be generated in this case will be considered with respect to the most closely resembling head core (e.g. $H_i$, $H_{i'}$). Since all the combinations are used, the row vectors of the coil matrix inevitably include one row vector $(a_{i'1}, \ldots, a_{i'j}, \ldots, a_{i'n})$ which involves just one different element from the vector $(a_{i1}, \ldots, a_{ij}, \ldots, a_{in})$. The magnetic flux which is generated in the head core $H_{i'}$ corresponding to the aforementioned resembling row vector satisfies $\Phi_{i'} = N - 2$. Consequently, the ratio, R, of the largest magnetic flux generated in all the non-selected head to the magnetic flux generated in the selected head has the value of $(N-2)/N$. In this case, the relation among the number of drive lines, the number of heads and the magnetic flux ratio is as shown in Table 1.

TABLE 1

| Number of drive lines (n) | Number of head (m) | Magnetic flux ratio (R) |
|---|---|---|
| 2 | 2 | 0 |
| 3 | 4 | ⅓ |
| 4 | 8 | ½ |
| 5 | 16 | 3/5 |
| 6 | 32 | ⅔ |
| 7 | 64 | 5/7 |
| 8 | 128 | ¾ |
| 9 | 256 | 7/9 |
| 10 | 512 | 4/5 |
| 11 | 1024 | 9/11 |
| 12 | 2048 | 5/6 |
| . | . | . |
| . | . | . |

As is clear from Table 1, the magnetic flux ratio is not necessarily decreased sufficiently when all the possible combinations of row vectors are used in the coil matrix. To cope with this difficulty, those combinations in which the magnetic flux ratios are larger have to be eliminated.

In this case, it is necessary to make the aforementioned elimination of specific combinations on condition that the number of magnetic head cores, m, should be maximized for a fixed number of drive lines, n, and a fixed magnetic flux ratio, R, involved. This condition can be actually fulfilled by a method similar to one followed in the formation of an ECC (error correcting code) which involves a code length of n-bits (corresponding to the number of the drive lines #n), a minimum Hamming distance of d and a maximum Hamming distance of n-d. On the assumption that the element $a_{ij}$ of the coil matrix is read out as "0" when its value is $-1$ and as "1" when its value is 1, the row vector of this coil matrix may be considered as constituting an ECC of n-bits. It follows, accordingly, that the total number of unlike codes included in this ECC equals the largest number of head cores, m, involved. The magnetic flux ratio in this case is expressed as follows.

$$|R| = \frac{n - 2d}{n} \quad (2)$$

In a typical example resulting from this elimination, the relations between the number of drive lines and the number of heads which exist when the magnetic flux ratio is 0, ⅓ and ½ respectively are shown in Table 2 below.

TABLE 2

| Number of drive lines (n) | Number of head (m) | Magnetic flux ratio (R) |
|---|---|---|
| 2 | 2 | 0 |
| 4 | 4 | |
| 8 | 8 | |
| 12 | 12 | |
| 16 | 16 | |
| 20 | 20 | |
| 24 | 24 | |
| . | . | |
| . | . | |
| 3 | 4 | ⅓ |
| 6 | 16 | |
| 12 | 64 | |
| 18 | 256 | |
| 24 | 2048 | |
| . | . | |
| . | . | |
| 4 | 8 | ½ |
| 8 | 64 | |
| 16 | 512 | |
| . | . | |
| . | . | |

It is clear from Table 2 that perfect elimination of the magnetic flux generated in all the non-selected head cores (R=0) necessitates equalization of the number of driving networks with the number of heads. In this case, the magnetic head may be used for analog signals. Since relatively large magnetic flux ratios are tolerated such as in digital signals, the number of heads may be increased proportionately over that of drive lines.

Figure 4:
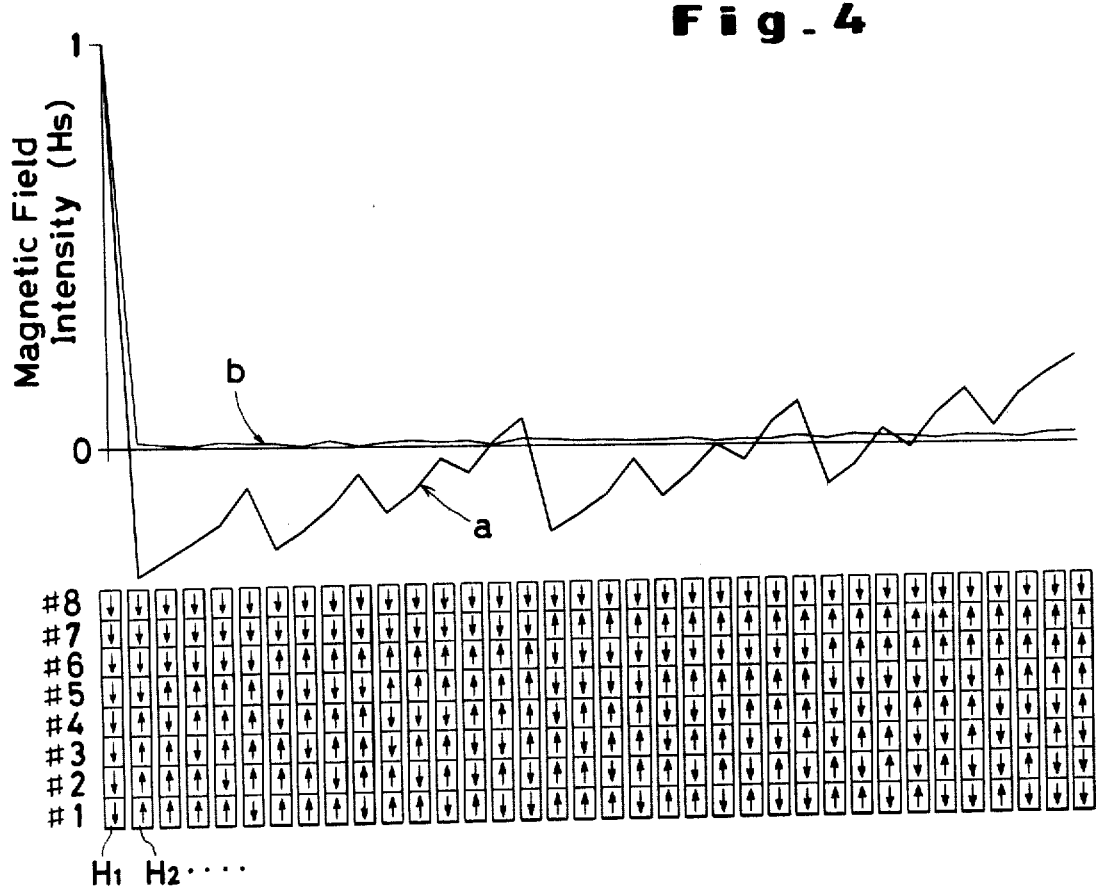
FIG. 4 is a schematic diagram illustrating another embodiment of this invention, which is controlled by the magnitude of the electric current.

In addition to the necessary elimination of specific combinations mentioned above, the actual magnetic head has to fulfill another requirement that the absolute value of electric current delivered to the drive lines should be adjusted as by compensating the differences in flux transfer efficiency dependent on the distances from the individual coils to the pole-tip of the respective head cores. FIG. 4 represents the results of a test conducted by use of an enlarged model head for the purpose of proving the importance of the requirement mentioned above. This test was conducted with one head core of laminated permalloy 500 mm in length, 60 mm in width and 30 mm in thickness. A total of eight coils were wound each 75 turns on this head core. In the diagram, the arrow marks placed in the lower portion of the appearance of a matrix represent the directions in which the magnetomotive forces are generated by the relevant coils wound on the head core. The directions of these arrow marks correspond to the direction of electric current delivered to the drive lines #1-#8. The graph (a) in the diagram represents the variations of the magnetic field intensity to be formed in the direction perpendicular to the surface at the lower tip of the head core when the electric current of an absolute value of 5A is delivered. A selected magnetic field intensity $H_s$ is generated in the lower tip of the head core when all the magnetic fluxes generated by the coils in one head core have one same direction (as in the case of the core $H_f$ in the diagram). The magnetic field intensities indicated in the diagram are invariably represented in a form normalized with $H_s$. As is noted from the graph (a) in FIG. 4, magnetic fields actually occur, though to a slight extent, even in combinations wherein the values of magnetomotive force total 0. These magnetic fields can be reduced by delivering the flows of electric current having the absolute values shown in the following table to the drive lines. Consequently, there are obtained the results represented by the graph (b) in the diagram.

TABLE 3

| Line No. | Absolute value of electric current (A) |
|---|---|
| #1 | 2.96 |
| #2 | 3.66 |
| #3 | 4.22 |
| #4 | 4.93 |
| #5 | 5.80 |
| #6 | 6.77 |
| #7 | 8.17 |
| #8 | 10.00 |

The otherwise possible increase of the magnetic flux ratio, therefore, can be prevented by controlling the absolute values of electric current flowing to the drive lines so as to compensate the differences to flux transfer efficiency dependent upon the distances from the coils to the pole-tip of the respective head cores. Desired reduction of a positive or negative magnetic flux ratio can be materialized by controlling the absolute values of electric current flowing to the drive lines. In this case, however, the reduction is effected in only one magnetic-flux direction.

As described above, this invention aims to provide a magnetic head adapted so that, from among a number of head cores equal to or greater than the number of drive lines formed such as of coils, only the selected core is excited amply and the remaining cores are excited to a very small extent. This magnetic head of the present invention may otherwise be utilized as a readback head which serves the purpose of reading the signals stored in a proper recording medium. Readback of recorded signals may be realized by various methods using the magnetic head of this invention formed as described above. A typical example of the application of the magnetic head to the readback of digital signals will be described below.

This example involves use of two perpendicular heads Ha, Hb for the reading of digital signals which are recorded in advance in the two tracks Ta, Tb on the magnetic tape M, as illustrated in FIG. 5. The principle of the operation of this arrangement is as follows. The binary-coded signals 1, 0 on the magnetic tape M retain magnetization of opposite signs. When the two head cores are parallelly move on the two tracks, the potentials corresponding to the magnetic fields generated by the magnetization on the tape are generated in the respective coils. It is now assumed that when the head core Ha confronts the binary-coded signal "1" as illustrated, positive and negative potentials are generated respectively in the drive lines #1, #2 on the head core Ha and negative potentials are generated in both the drive lines #1, #2 on the head core Hb. In this case, theoretically, the potentials in the drive line #1 offset each other to give an output of 0 and the potentials in the drive line #2 add to each other to produce a potential twice as large (assumed to give a value of $-2$, for the sake of explanation). The two binary-coded signals thus recorded on the tape can produce potentials in the drive lines as shown in the following table. In this table, the various combinations of the binary-coded signals which the head cores Ha, Hb can form are indicated besides the symbols Ha, Hb.

TABLE 4

|  | Ha → 1<br>Hb → 1 | Ha → 1<br>Hb → 0 | Ha → 0<br>Hb → 1 | Ha → 0<br>Hb → 0 |
|---|---|---|---|---|
| #2 | −2 | 0 | 0 | +2 |
| #1 | 0 | +2 | −2 | 0 |

Figure 6:
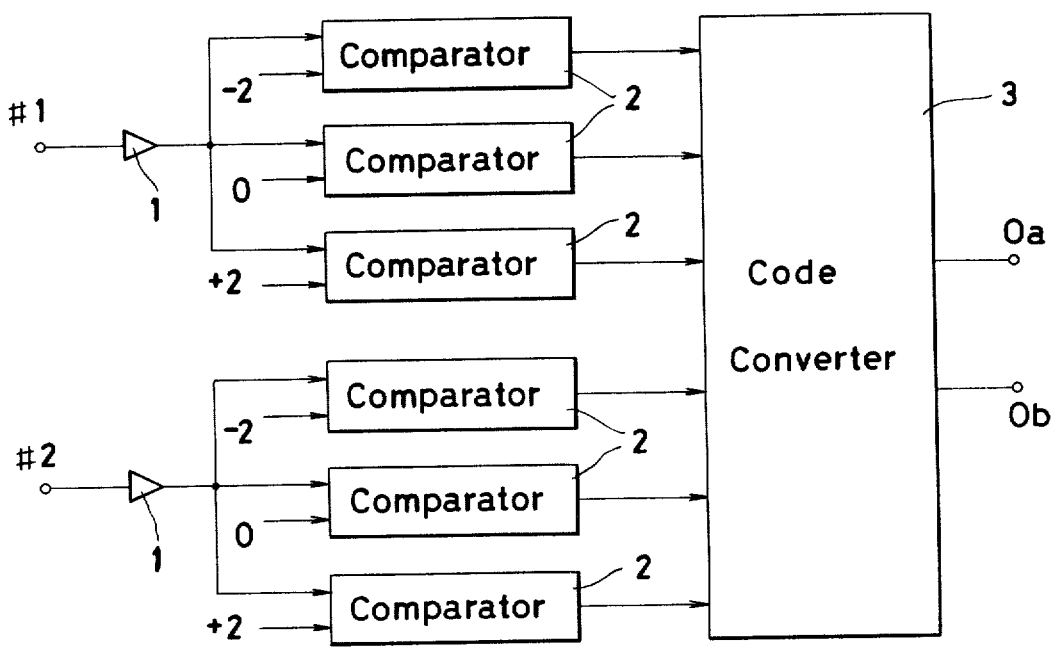
FIG. 6 is a block circuit diagram of one preferred embodiment of this invention as modified for the processing of readout signals from the readback magnetic head according to this invention.

It is seen from Table 4 that a total of four patterns of characteristic potential differences can be determined by the kinds of signals to be received. Digital detection of these potentials can easily be accomplished by comparing the potential differences in a level comparator and then subjecting the output of the level comparator to code-converting operation in a code converter. In this processing, where the drive lines #1, #2 issue the outputs of +2 and 0 respectively, for example, there will be drawn a conclusion that the head Ha has the value of 1 and the head Hb the value of 0. FIG. 6 represents one typical processing circuit which is suitable for the example operation cited above. The signals from the two drive lines are amplified by an amplifier 1, and then compared in a comparator 2. The output of "1" issues when they agree and the output of "0" issues when they fail to agree. The signals are received in a code converter 3 and converted into data from the respective tracks. The desired data are read out of output terminals Oa, Ob corresponding to the recording tracks. The example described so far involves use of two heads. With modern electronic technology, a circuit capable of processing signals from a greater number of heads on the basis of the principle described above can be easily formed.

Besides, a magnetic head concurrently serving the dual purpose of recording and readback data without appreciably increasing the number of terminals and the number of lines for connection with external circuits can be formed by combining the magnetic head of this invention such as with a plurality of readback heads (MR heads) which use magneto-resistance elements and are arranged in the form of a matrix.

According to the present invention, selective excitation can be effected on a plurality of magnetic head cores by proper control of the number of drive lines which is equal to or smaller than the number of the aformentioned magnetic head cores. By effective use of the thin-film processing techniques and the photolithography, the magnetic heads of the present invention can be subjected to high-density integration on a mass-production basis. Thus, the magnetic head of the present invention combines the adaptability to multitrack recording media of high capacity for data and the inexpensive productivity. Since the access time is short, the magnetic head promises high-speed processing of data.

What is claimed is:

1. A load-sharing type magnetic head, comprising:
a plurality of mutually independent head cores; and a plurality of serial drive lines each wound successively on the respective head cores to form coils on each head core, with the sequence of said coils on each head core differing in winding direction from that on any other head core in the whole system, whereby electric currents each having a polarity so determined that said coils on one selected head core produce magnetic fluxes in the same direction are respectively supplied to all of said coils thereby causing one selected head core to be excited to an amply large extent to consequently permit signals to be recorded in a selected one of tracks on a recording medium.

2. The load-sharing type magnetic head according to claim 1, wherein one selected head core is excited to an amply large extent and the remaining head cores are excited to an amply small extent by controlling the absolute values of electric current flowing to the drive lines and thereby compensating the differences of flux transfer efficiency which are dependent upon the distances from the plurality of coils wound on the head cores to the pole-tip of the respective head cores.

3. The load-sharing type magnetic head according to claim 1, wherein the number of drive lines is decreased in comparison with the number of head cores except that the ratio of the largest magnetic flux generated in any of the non-selected head cores to the magnetic flux generated in the selected head core is 0.

4. A load-sharing type magnetic head, comprising:
a plurality of mutually independent head cores; and
a plurality of serial drive lines each wound successively on the respective head cores to form coils on each head core, with the sequence of said coils on each head core differing in winding direction from that on any other head core in the whole system, whereby magnetic signals from the recording medium are delivered to a plurality of head cores in order to generate a magnetomotive force in the coils wound on the head cores in such a manner as to cause the plurality of drive lines to issue potential signals in order to read out the magnetic signals from the recording medium in conformity with a pattern of the potential differences from the drive lines whereby each of said magnetic signals from said recording medium produces a corresponding potential signal differing from every other magnetic signal read out from said recording medium.

5. The load-sharing type magnetic head according to claim 4, wherein the plurality of drive lines are adapted to issue potential signals capable of reading the digital data from the recording medium by subjecting said digital data to processing for level comparison and code conversion.

* * * * *